(12) United States Patent
Park (10) Patent No.: US 7,880,531 B2
(45) Date of Patent: Feb. 1, 2011

(54) SYSTEM, APPARATUS, AND METHOD FOR SELECTABLE VOLTAGE REGULATION

(75) Inventor: Jae Kwan Park, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 426 days.

(21) Appl. No.: 12/018,442

(22) Filed: Jan. 23, 2008

(65) Prior Publication Data

US 2009/0184697 A1    Jul. 23, 2009

(51) Int. Cl.
G05F 1/10 (2006.01)
G05F 3/02 (2006.01)
(52) U.S. Cl. .................. 327/538; 327/536; 327/308; 327/306; 327/540; 341/144; 341/154
(58) Field of Classification Search ............... 327/538, 327/536, 308, 306, 540; 341/144, 154
See application file for complete search history.

(56) References Cited

U.S. PATENT DOCUMENTS

| 5,119,095 | A |   | 6/1992  | Asazawa                    |
|-----------|---|---|---------|----------------------------|
| 5,388,084 | A | * | 2/1995  | Itoh et al. ........ 365/185.23 |
| 6,002,354 | A | * | 12/1999 | Itoh et al. ............ 341/144 |
| 6,061,289 | A |   | 5/2000  | Itoh et al.                |
| 6,107,862 | A | * | 8/2000  | Mukainakano et al. ...... 327/536 |
| 6,259,612 | B1 | * | 7/2001 | Itoh .................... 363/60 |
| 6,404,274 | B1 |   | 6/2002 | Hosono et al.           |
| 6,686,789 | B2 |   | 2/2004 | Lopata et al.           |
| 7,002,869 | B2 |   | 2/2006 | Zhang et al.            |
| 7,114,084 | B2 |   | 9/2006 | Cioaca                  |
| 7,440,342 | B2 | * | 10/2008 | Pan ................... 365/189.09 |
| 7,477,092 | B2 | * | 1/2009 | Pan ......................... 327/536 |
| 7,586,362 | B2 | * | 9/2009 | Pan et al. ................. 327/537 |
| 7,595,684 | B2 | * | 9/2009 | Maejima .................. 327/538 |

* cited by examiner

Primary Examiner—Bao Q Vu
(74) Attorney, Agent, or Firm—TraskBritt (57) ABSTRACT

Apparatuses, systems, and methods are disclosed for generating, regulating, and modifying various voltage levels on a semiconductor device using a current mirroring digital-to-analog voltage regulator. The voltage regulator operates by mirroring a reference current onto a selectable current level and controlling the selectable current level with a digital input to a plurality of switched CMOS devices connected in parallel. The switched CMOS devices generate the selectable current level responsive to the digital input and proportional to the reference current. The selectable current level is combined with an output of a voltage divider to generate a monitor signal. The monitor signal is compared to a reference voltage and the results of the comparison controls a charge pump to generate a pumped voltage. The pumped voltage is fed back to the voltage divider, which includes a feedback resistor and a reference resistor connected in series between the pumped voltage and ground.

25 Claims, 6 Drawing Sheets

SYSTEM, APPARATUS, AND METHOD FOR SELECTABLE VOLTAGE REGULATION

FIELD OF THE INVENTION

Embodiments of the present invention relate to semiconductor devices and, more particularly, to internal voltage generating circuits on semiconductor devices.

BACKGROUND

Many semiconductor devices require multiple voltage sources for operation. In particular, nonvolatile memories such as Flash memory and Electrically Erasable Programmable Read Only Memory (EEPROM) generally require an operating voltage and other relatively high voltages to perform write and erase operations. Other voltage levels may be required on memories and many other semiconductor devices for supplying sense amplifiers, analog devices, fuses, antifuses, input/output devices, analog-digital converters, digital-to-analog converters and other similar devices.

Conventionally, most of these voltage sources have been supplied externally from the semiconductor device and brought into the device through bonding pads. With external voltage sources, the voltage level can be controlled precisely and used in multiple devices within a system. However, there is a limit to the number of voltages a system can support and the number of bonding pads and pins that a semiconductor device can dedicate to voltage sources.

Recently, internal voltage generators have been used to generate the increasing number of different voltage levels that may be required on modern semiconductor devices. Some of these voltage generators have been programmable so the voltage generator can produce a variety of different voltage levels based on the programmed value. However, many of these programmable voltage generators use two or more signals that must be at the same potential. A difference in potential on these signals can lead to inaccuracies in the resulting voltage level.

Furthermore, many of these programmable voltage generators are implemented with a large number of resistors for generating a variety of current levels, which are then used to generate the various programmable voltage levels. However, resistors can be difficult to fabricate precisely on semiconductor devices. Even if the resistors are fabricated with enough precision, they may also require significant real estate on the semiconductor device.

Figure 1:
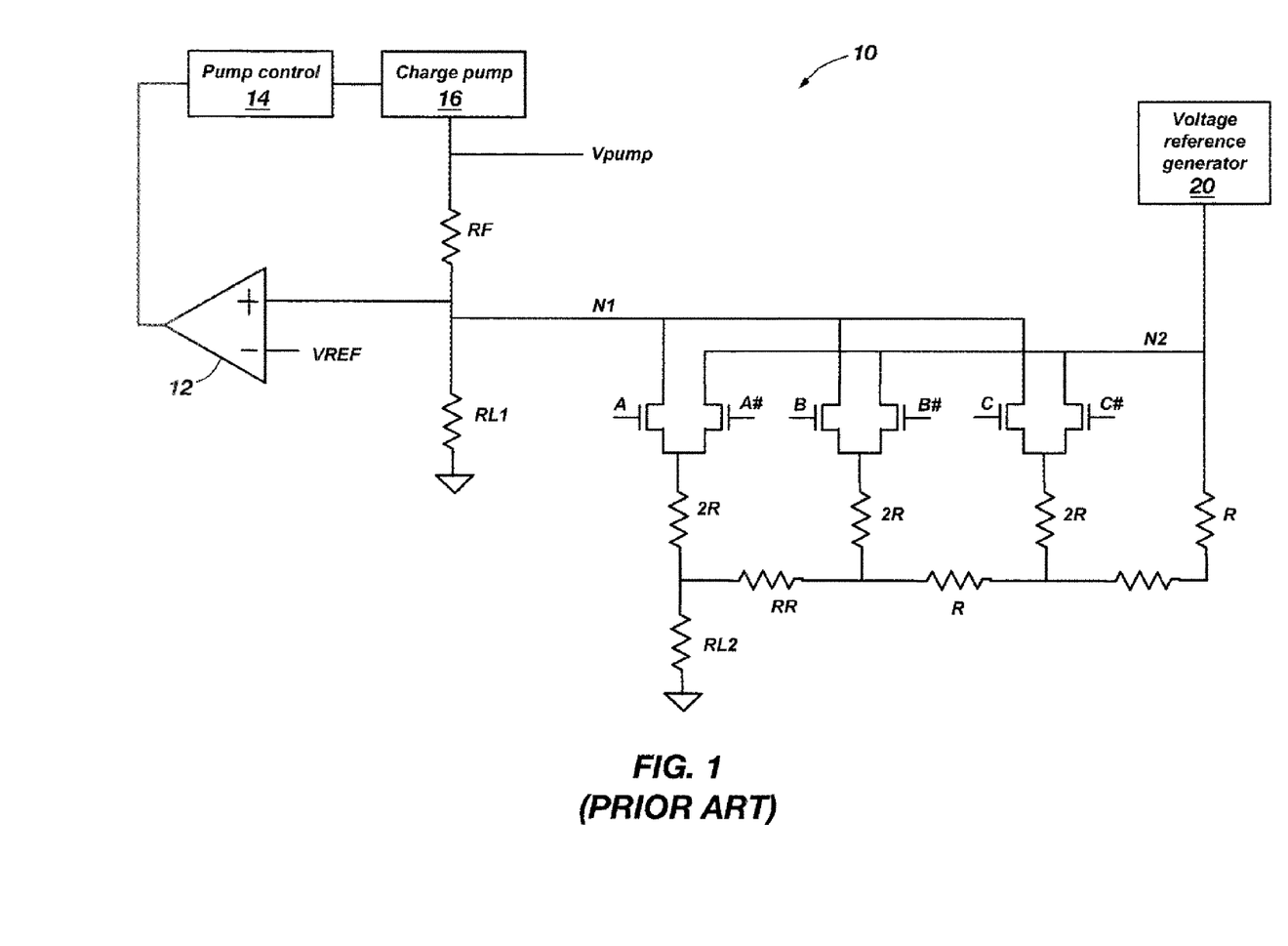
FIG. 1 is a simplified circuit diagram of a conventional programmable voltage regulator.

FIG. 1 is a simplified circuit diagram of a conventional programmable voltage regulator 10. The voltage regulator 10 includes a comparator 12, a pump control 14, a charge pump 16, a feedback resistor RF connected between the output of the charge pump 6 and node N1, and a first load resistor RL1 connected between node N1 and ground.

The comparator 12 compares node N1 to a voltage reference VREF to generate a signal for the pump control 14. The pump control 14 uses this signal to control the charge pump 16, which generates a pumped voltage Vpump to drive the feedback resistor RF.

Node N1 is also coupled to a digital-to-analog converter. For each bit of the digital input (A, B, C), the digital-to-analog converter includes a pair of n-channel transistors coupled to a resistor of a conventional R-2R resistor ladder, which is connected to a second load resistor RL2. One n-channel transistor from the pair of transistors is connected to node N1 and the other transistor from the pair of transistors is connected to node N2. Node N2 is connected to a voltage reference generator 20.

In operation, the nodes N1 and N2 are configured to be at the same potential such that they appear as virtual nodes of each other. As a result, each pair of n-channel transistors, when enabled, conducts the same amount of current because one or the other of the pair of transistors is enabled. As an example, if A is high, A# will be low and node N1 will conduct through the transistor coupled to A. Similarly, if B is low and B# is high, node N2 will conduct through the transistor coupled to B#. In this fashion, a constant current is supplied to the R-2R resistor ladder regardless of the digital input value. However, some of the current will flow through N1 and some of the current will flow through N2 based on the value on the digital input (A, B, C). Thus, the value on the digital input selects how much current flows on N1 to affect the feedback mechanism of the comparator 12, pump control 14, and charge pump 16, resulting in an output voltage Vpump related to the digital input.

However, if the voltage on N2 drifts, relative to the VREF signal at the comparator 12, the voltage on N1 may drift relative to N2 resulting in inaccuracies in the digital-to-analog converter. In addition, the R-2R resistor ladder includes many resistors. These resistors may be difficult to fabricate accurately and may occupy substantial space on a semiconductor device.

There is a need for apparatuses, systems, and methods to generate and regulate voltage levels on a semiconductor device. There is also a need to make these voltage levels easily programmable with reduced vulnerability to noise levels and with devices that are easily fabricated.

BRIEF DESCRIPTION OF THE DRAWINGS

In the drawings, which illustrate embodiments of the invention.

DETAILED DESCRIPTION

In the following detailed description, reference is made to the accompanying drawings that form a part hereof, and in which is shown by way of illustration specific embodiments in which the invention may be practiced. These embodiments are described in sufficient detail to enable those of ordinary skill in the art to practice the invention, and it is to be understood that other embodiments may be utilized, and that structural, logic, and electrical changes may be made within the scope of the present invention.

In this description, circuits and functions may be shown in block diagram form in order not to obscure the present invention in unnecessary detail. Furthermore, specific circuit implementations shown and described are only examples and should not be construed as the only way to implement the present invention unless specified otherwise herein. Block definitions and partitioning of logic between various blocks represent a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

The terms "wafer" and "substrate" are to be understood as a semiconductor-based material including silicon, silicon-on-insulator (SOI) or silicon-on-sapphire (SOS) technology, doped and undoped semiconductors, epitaxial layers of silicon supported by a base semiconductor foundation, and other semiconductor structures. Furthermore, when reference is made to a "wafer" or "substrate" in the following description, previous process steps may have been utilized to form regions or junctions in or over the base semiconductor structure or foundation. In addition, the semiconductor need not be silicon-based, but may be based on silicon-germanium, silicon-on-insulator, silicon-on-sapphire, germanium or gallium arsenide, among others.

Resistor elements are described herein. Those of ordinary skill in the art will recognize that these are elements with an impedance property that may be discrete devices, a combination of discrete devices, or other elements with resistance properties. As a non-limiting example, routing comprised of metal, polysilicon, diffusion elements, and combinations thereof have resistance properties such that the routing elements themselves may comprise the "resistance property" or "resistor element."

Embodiments disclosed herein include apparatuses, systems, and methods to generate, regulate, and modify various voltage levels on a semiconductor device using a current mirroring digital-to-analog converter.

Figure 2:
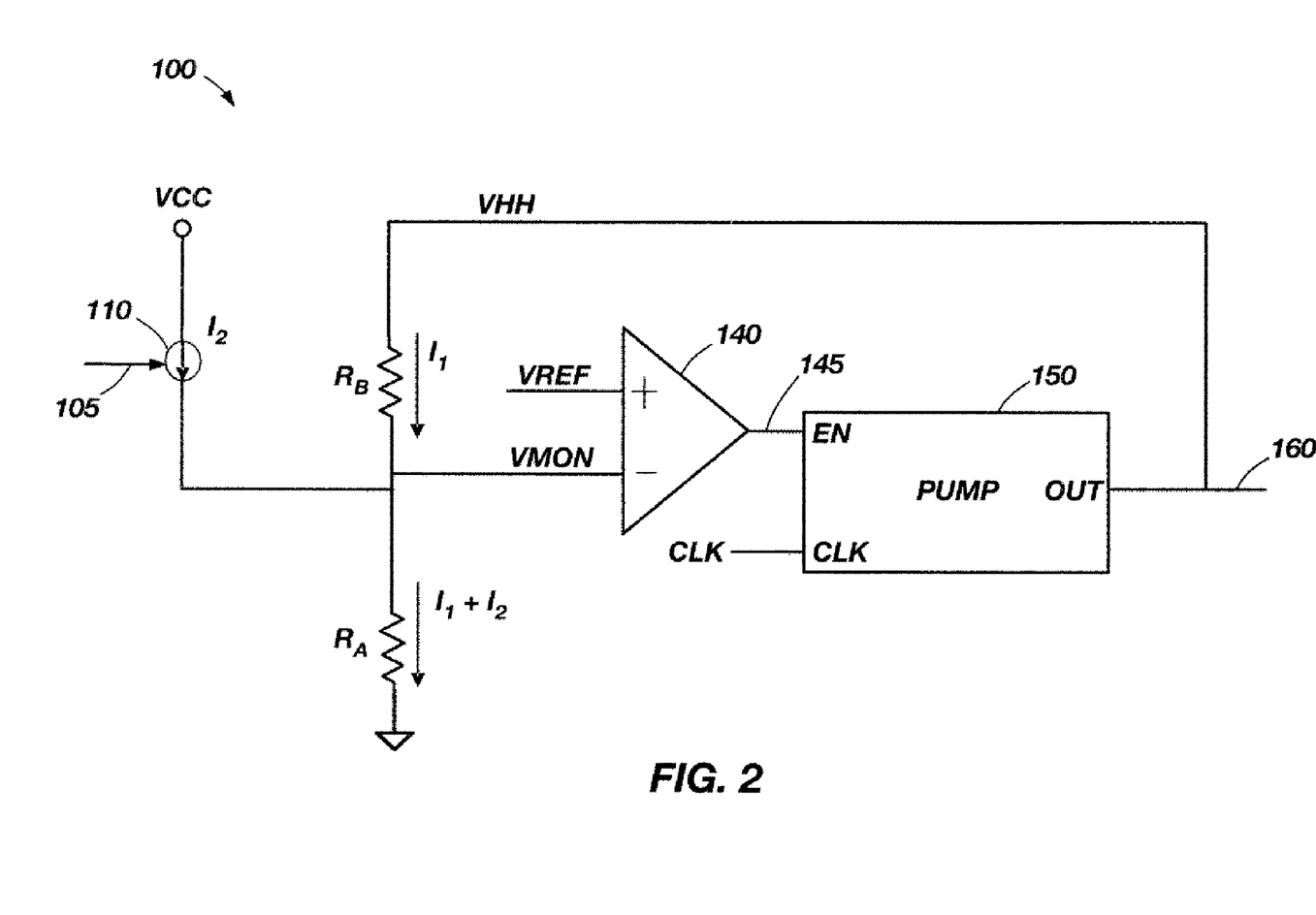
FIG. 2 is a simplified circuit diagram of a voltage regulator using a programmable current source according to an embodiment of the present invention.

FIG. 2 is a simplified circuit diagram of an embodiment of a programmable voltage regulator 100 using a digital-to-analog current generator 110, which generates a selectable current level $I_2$ (may also be referred to herein as a control current) correlated to a digital input 105. A comparator 140 is configured to compare a reference voltage VREF and a monitor signal VMON to generate a comparison output 145. The comparison output 145 feeds a charge pump 150, which generates a pumped voltage VHH (may also be referred to as an output voltage 160 or an output signal 160). The charge pump 150 is clocked by clock signal CLK and generates the pumped voltage VHH responsive to the comparison output 145. The pumped voltage 160 is fed back through a voltage divider to generate a divided output coupled to the monitor signal VMON. The voltage divider includes a feedback resistor $R_B$, with a feedback current $I_1$ flowing therethrough, and a reference resistor $R_A$. The digital-to-analog current generator 110 is also coupled to the monitor signal VMON. As a result, the monitor signal VMON is a combination of the divided output and the digital-to-analog current generator 110.

When in a steady state, VMON will equal VREF due to the feedback mechanism of the comparator 140, the charge pump 150, and the feedback resistor $R_B$. As an equation, VMON may be written as a function of the feedback current $I_1$ and the selectable current level $I_2$, as shown in equation A1.

$$VMON = VREF - R_A \times (I_1 + I_2) \tag{A1}$$

When the feedback mechanism is in a steady state, the pumped voltage may be written as equation A2.

$$VHH = VREF + I_1 \times R_B \tag{A2}$$

Combining equations A1 and A2 yields an equation for the pumped voltage VHH in terms of the resistors $R_A$ and $R_B$, the reference voltage VREF and the selectable current level $I_2$.

$$VHH = \left[ VREF \times \left(1 + \frac{R_B}{R_A}\right) \right] - R_B \times I_2 \tag{A3}$$

Figure 3:
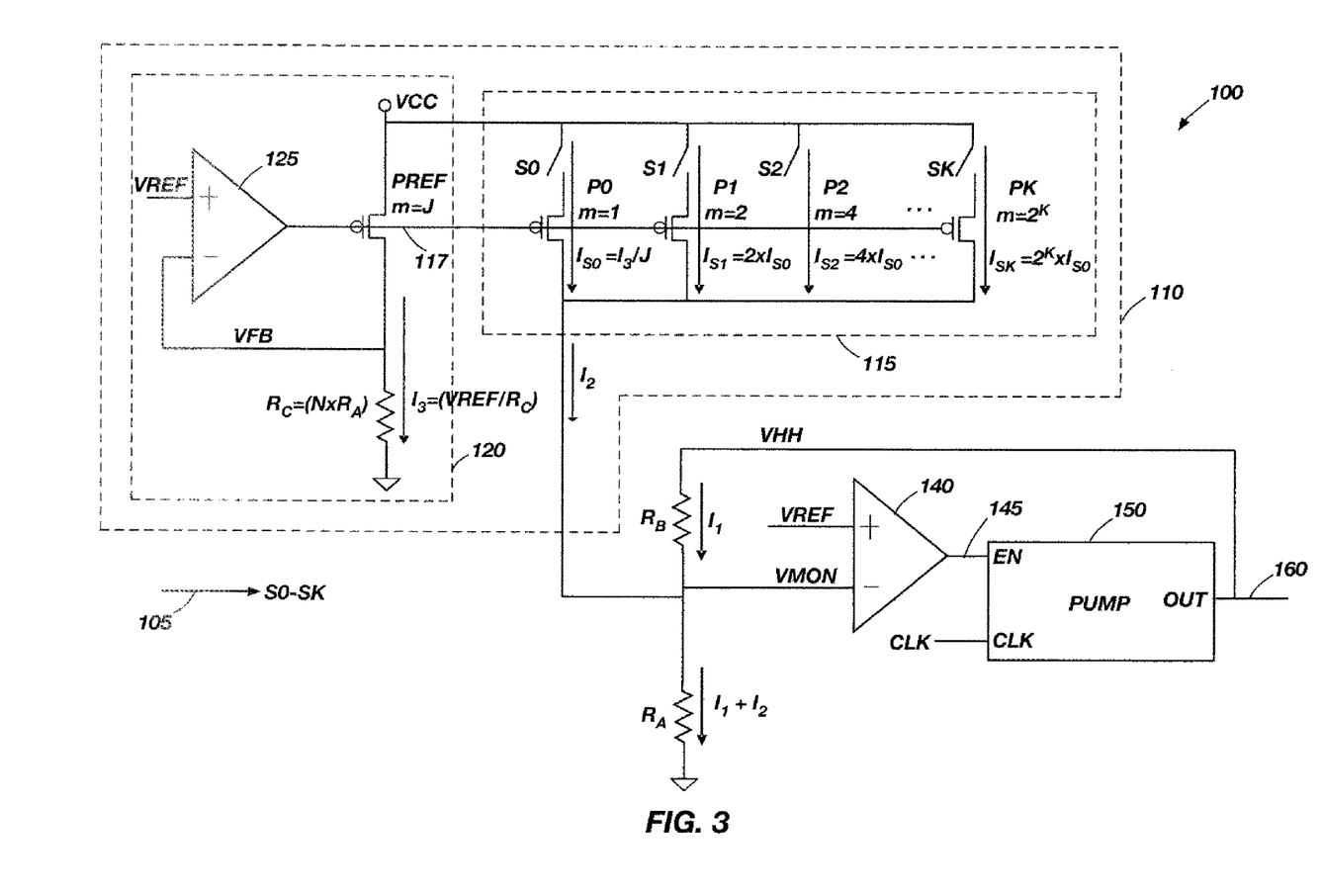
FIG. 3 is a simplified circuit diagram of the embodiment of the voltage regulator of FIG. 2 showing additional details of the programmable current source.

FIG. 3 is a simplified circuit diagram of the programmable voltage regulator 100 of FIG. 2 illustrating additional details of the digital-to-analog current generator 110. As with FIG. 2, the programmable voltage regulator 100 of FIG. 3, includes the comparator 140, the comparison output 145, the charge pump 150 controlled by the clock CLK, the pumped voltage VHH, the feedback resistor $R_B$ the reference resistor $R_A$, and the digital-to-analog current generator 110. The digital-to-analog current generator 110 includes a reference voltage generator 120 and a selectable current source 115.

The selectable current source 115 includes a set of switched CMOS devices connected in parallel to generate the selectable current level $I_2$. Each switched CMOS device includes a switch (S0, S1, S2, SK) and a p-channel transistor (P0, P1, P2, PK) in series between a voltage source VCC and the selectable current level $I_2$. The p-channel transistors (P0, P1, P2, PK) are controlled by mirror reference voltage 117.

The voltage generator includes a second comparator 125, a reference current source PREF and a sink resistor $R_C$. The reference current $I_3$ flowing through the sink resistor $R_C$ produces a feedback voltage VFB that is compared to a reference voltage VREF. In FIG. 3, the reference voltage VREF used with the second comparator 125 is illustrated as the same reference voltage VREF used with the comparator 140. However, embodiments of the invention are not so limited. The comparator 140 and second comparator 125 may use different reference voltages. When in a steady state, the feedback voltage VFB equals the reference voltage VREF, which may be written as equation A4.

$$VFB = VREF \tag{A4}$$

The reference current $I_3$ can be represented in terms of the reference voltage VREF and the reference resistor $R_A$, which may be written as equation A5.

$$I_3 = VREF/(N \times R_A) \tag{A5}$$

In equation A5, the reference current $I_3$ is written with a scaling factor N relative to the reference resistor $R_A$. If the same reference voltage VREF is used for both the comparator 140 and second comparator 125, then the scaling factor N is simply a relative size between the sink resistor $R_C$ and the reference resistor $R_A$. In other words, with N equal to 2, the sink resistor $R_C$ is twice the size of the reference resistor $R_A$, f a different reference voltage VREF is used for the comparator 140 relative to the second comparator 125, then the scaling factor N may include a relationship between the two reference voltages along with a relationship between the sink resistor $R_C$ and the reference resistor $R_A$. In other words, if VREF for the second comparator 125 is twice the VREF for the comparator 140 and the sink resistor $R_C$ is the same size as the reference resistor $R_A$, then N would equal 2. Of course, those of ordinary skill in the art will recognize that many relationships between the reference voltages VREF, sink resistor $R_C$, and reference resistor $R_A$ are possible within the scope of the present invention.

In FIG. 3, each of the p-channel transistors (P0, P1, P2, PK) may be a different size. As a non-limiting example, the sizes of the p-channel transistors (P0, P1, P2, PK) are in powers of 2. In other words, p-channel transistor P0 has a relative size of 1, p-channel transistor P1 has a relative size of 2, p-channel transistor P2 has a relative size of 4, and p-channel transistor PK has a relative size of $2^K$. As a result, the combination of the p-channel transistors (P0, P1, P2, PK) in parallel can be configured by the switches (S0, S1, S2, SK) to create a selectable current level $I_2$ proportional to a binary representation on the digital input 105. As a non-limiting example, if K equals 3, a digital input of 1101 would enable current flow through p-channel transistors P3, P2, and P0 and disable current flow through P1.

The switched CMOS devices 115 are connected in a current mirror configuration with the reference current source PREF. A current mirror is a configuration comprising two transistors (or sets of transistors) of the same type (e.g., both p-channels or both n-channels) in which the sources of the transistors are connected together and the gates of the transistors are connected together. Current mirrors operate on the theory that if the two transistors are similarly processed and have sizes W/L (i.e., width/length) in a defined proportion M, then the current relationship through the two transistors will have the same proportion M.

For example, in FIG. 3, one transistor is the reference current source PREF and the mirroring transistor is the set of transistors (P0, P1, P2, PK). If the reference current source PREP has the same W/L as the combination of the set of transistors, then they will have substantially the same amount of current flowing through them. This is so because both transistors are connected to the same source, and have the same gate to source voltage, which defines the magnitude of the drain current. As a result, when in a steady-state, the reference current $I_3$ will equal the selectable current level $I_2$.

In FIG. 3, the size of the reference current source PREP is selected as:

$$J = 2^{(k+1)} - 1 \quad (A6)$$

Therefore, to carry on the previous example of K=3, J would be 15. With the binary weighting, the current through p-channel transistors P0 would h:

$$I_{S0} = I_3/J \quad (A7)$$

Similarly, $I_{S1}$ would equal $2*I_{S0}$, $I_{S1}$ would equal $2*I_{S0}$, $I_{S2}$ would equal $4*I_{S0}$, and $I_{SK}$ would equal $2^K*I_{S0}$. As a result, if all four p-channel transistors (P0, P1, P2, PK) were enabled, the summation of current through the transistors, and onto the selectable current level $I_2$, would be: $I_2 = I_{S0} + I_{S1} + I_{S2} + I_{S3} = I_3/J + 2I_3/J + 4I_3/J + 8I_3/J = 15I_3/J$. Since J=15, $I_2$ equals $I_3$.

In other words, for any binary value A on the digital input 105, $I_2$ can be represented as:

$$I_2 = A \times I_{S0} \quad (A8)$$

Recall that $I_3$ is defined as VREF/(N×$R_A$) and the current mirror enforces that $I_3$ equals $I_2$. Therefore, using equations A7 and A5, $I_{SO}$ can be represented as:

$$I_{SO} = \frac{VREF}{J \times N \times R_A} \quad (A9)$$

And the summed selectable current level $I_2$ can be represented by combining equations A8 and A9, $$I_2 = VREF\left(\frac{A}{J \times N \times R_A}\right) \quad (A10)$$

Combining equation A3 with equation A10 yields an equation for the pumped voltage VHH.

$$VHH = VREF\left[1 + \frac{R_B}{R_A} - \left(\frac{R_B}{R_A} \times \frac{A}{N \times J}\right)\right] \quad (A11)$$

Or, equation A11 can be rearranged to represent the pumped voltage VHH as:

$$VHH = VREF + VREF\left[\frac{R_B}{R_A}\left(1 - \frac{A}{N \times J}\right)\right] \quad (A12)$$

For simplicity in explanation, if N is assumed to be 1, equation A12 can be interpreted such that VHH may span a range between a base voltage VBASE on the low end and VBASE+a boost voltage VBOOST on the high end. In equation A12, VBASE equals VREF. VBOOST would equal $VREF*(R_B/R_A)$ when A is programmed to its minimum value of 0. Conversely, VBOOST would equal 0 when A is programmed to its maximum value of J. More generally, VHH may be programmed in substantially equal steps between VBASE and VBASE+VBOOST based on the binary value A presented on the digital input 105. If N equals 1, each increment would be equal to:

$$INC = VREF\left[\frac{R_B}{R_A}\left(\frac{1}{J}\right)\right] \quad (A13)$$

Those of ordinary skill in the art will recognize that VBASE and the incremental adjustment amount INC can be varied by adjusting the relative values of $R_B$ and $R_A$. In addition, the scale factor N may be used to modify the size of the incremental factor because including N in the increment equation yields:

$$INC = VREF\left[\frac{R_B}{R_A}\left(\frac{1}{N \times J}\right)\right] \quad (A14)$$

In addition, the FIG. 3 embodiment has been described with a binary value for the digital input 105 to control the switches (S0, S1, S2, SK). Many other types of inputs, and correspondingly weighted sizes for the set of transistors (P0, P1, P2, PK), are possible. As another non-limiting example, the transistors (P0, P1, P2, PK) may be configured as all the same size, and the control current would be directly proportional to the number of transistors switched on by the digital input 105.

It will be readily apparent to those of ordinary skill in the art that the switches (S0, S1, S2, SK) described herein may be formed in a number of ways on a semiconductor device. By way of example, and not limitation, the switches may be formed as NMOS pass gates, PMOS pass gates, or CMOS pass gates.

Figure 4:
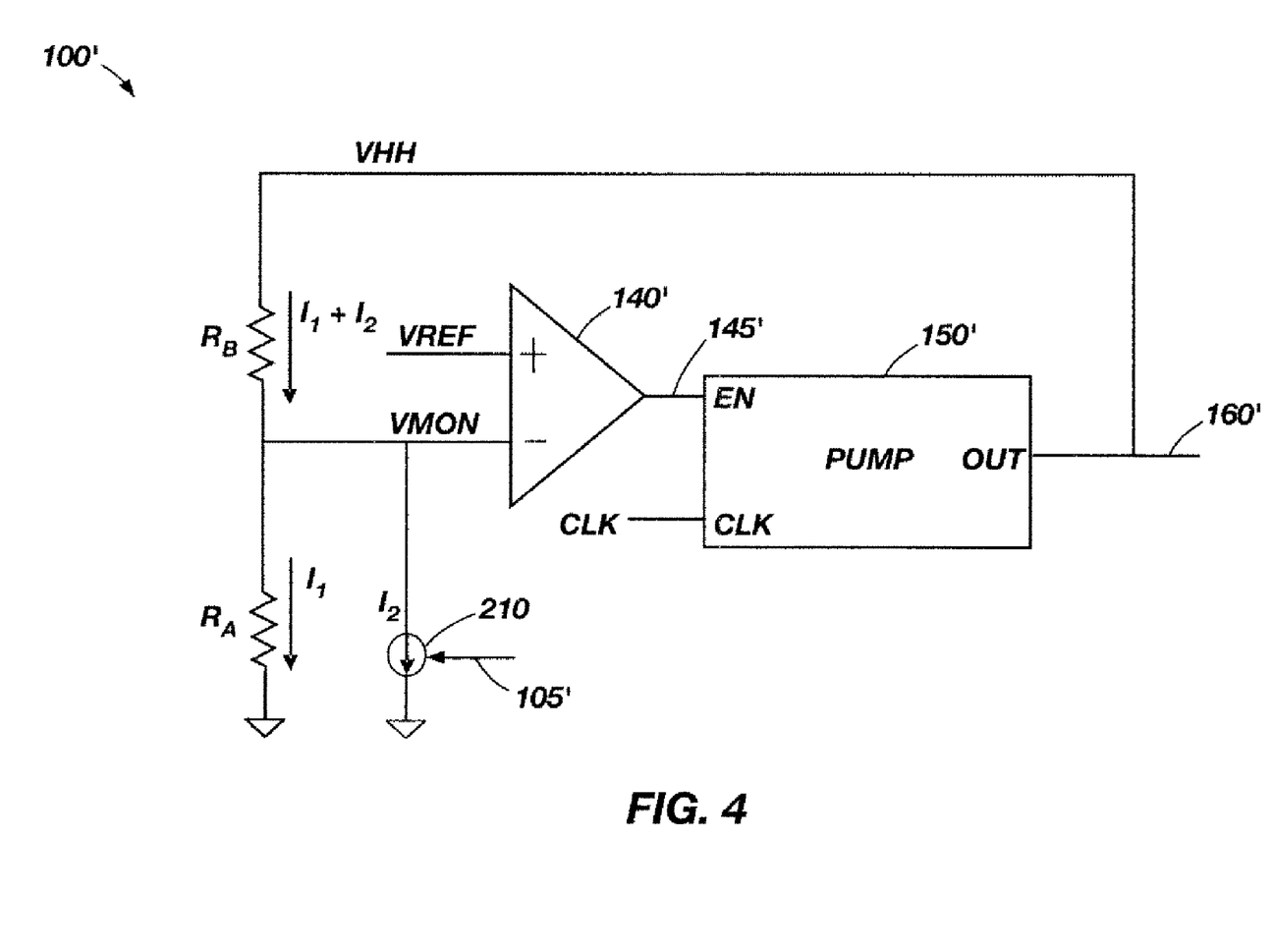
FIG. 4 is a simplified circuit diagram of a voltage regulator using a programmable current sink according to an embodiment of the present invention.

FIG. 4 is a simplified circuit diagram of another embodiment of a programmable voltage regulator 100' using a selectable current level $I_2$. In this embodiment, the selectable current level $I_2$ is configured as a digital-to-analog current generator 210 to sink a selectable current level $I_2$ correlated to a digital input 105'. As with the embodiment of FIG. 2, a comparator 140' is configured to compare a reference voltage VREF and a monitor signal VMON to generate a comparison output 145'. The comparison output 145' feeds a charge pump 150', which generates a pumped voltage VHH (may also be referred to as an output voltage 160' or an output signal 160'). The pumped voltage 160' is fed back through a voltage divider to generate a divided output coupled to the monitor signal VMON. The voltage divider includes a feedback resistor $R_B$, with a feedback current $(I_1+I_2)$ flowing therethrough, and a reference resistor $R_A$. The digital-to-analog current generator 210 is also coupled to the monitor signal VMON. As a result the monitor signal VMON is a combination of the divided output and the digital-to-analog current generator 210.

When in a steady state, VMON will equal VREF due to the feedback mechanism of the comparator 140', the charge pump 150', and the feedback resistor $R_B$. As an equation, VMON may be written as a function of the reference current $I_1$ and the reference resistor $R_A$, as shown in equation B1.

$$VMON = VREF = R_A \times I_1 \tag{B1}$$

When the feedback mechanism is in a steady state, the pumped voltage may be written as equation B2.

$$VHH = VREF + ((I_1 + I_3) \times R_B) \tag{B2}$$

Combining equations B1 and B2 yields an equation for the pumped voltage VHH in terms of the resistors $R_A$ and $R_B$, the reference voltage VREF and the selectable current level $I_2$.

$$VHH = \left[ VREF \times \left(1 + \frac{R_B}{R_A}\right) \right] + R_B \times I_2 \tag{B3}$$

Figure 5:
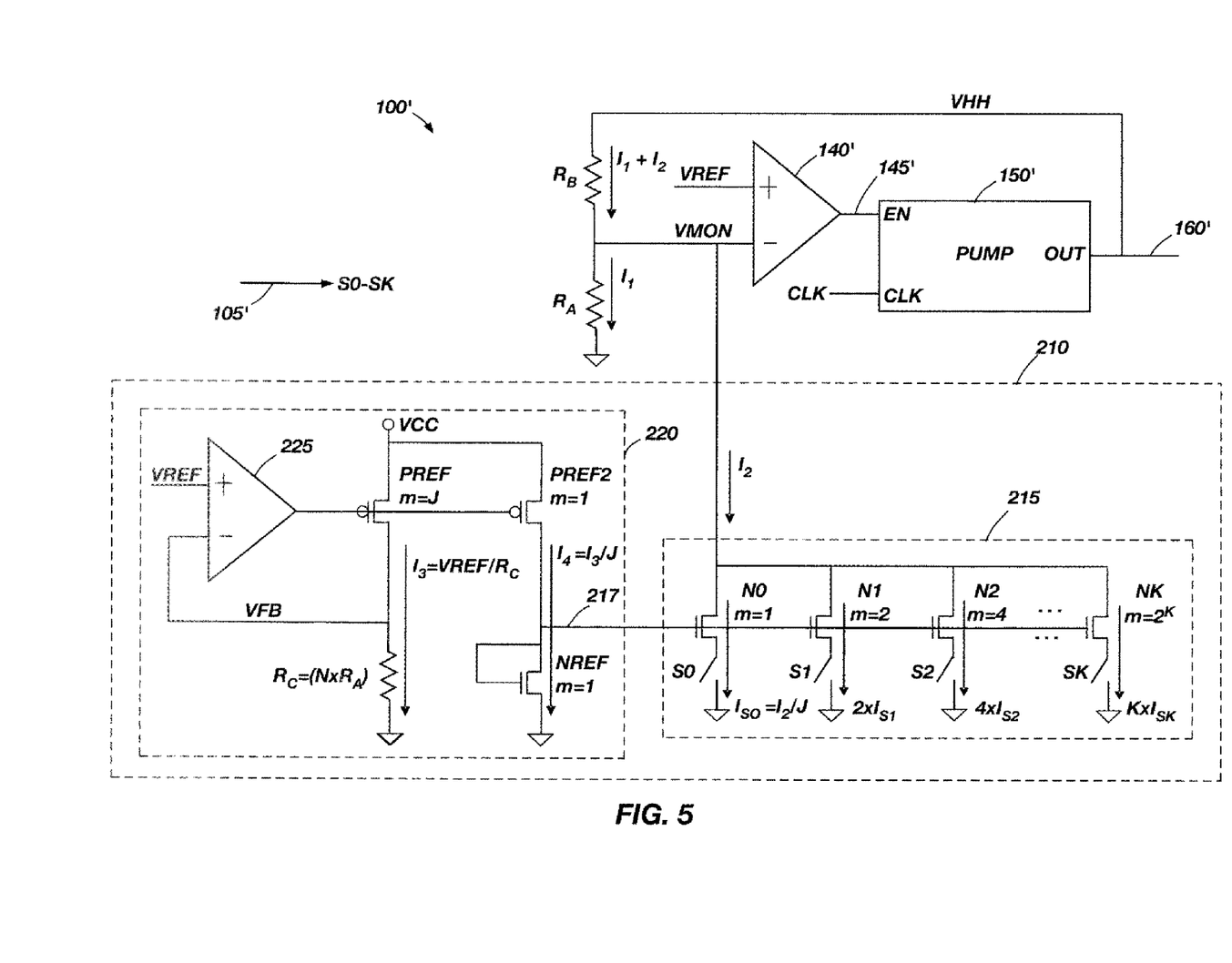
FIG. 5 is a simplified circuit diagram of the embodiment of the voltage regulator of FIG. 4 showing additional details of the programmable current sink.

FIG. 5 is a simplified circuit diagram of the programmable voltage regulator 100' of FIG. 4 illustrating additional details of a selectable current sink 215. As with FIG. 2, the programmable voltage regulator 100 of FIG. 3, includes the comparator 140', the comparison output 145', the charge pump 150' controlled by the clock CLK, the pumped voltage VHH, the feedback resistor $R_B$ the reference resistor $R_A$, and the digital-to-analog current generator 210. The digital-to-analog current generator 210 includes a reference voltage generator 220 and a selectable current sink 215.

The selectable current sink 215 includes a set of switched CMOS devices connected in parallel to generate the selectable current level $I_2$. Each switched CMOS device includes a switch (S0, S1, S2, SK) and a n-channel transistor (N0, N1, N2, NK) in series between the selectable current level $I_2$ and ground (or other suitable reference potential).

The voltage generator 220 includes a second comparator 225, a reference current source PREF, a sink resistor $R_C$ and a converter including a second reference current source PREF2 and a reference current sink NREF. The reference current $I_3$ flowing through the sink resistor $R_C$ produces a feedback voltage VFB that is compared to a reference voltage VREF. In FIG. 5 the reference voltage VREF used with the second comparator 225 is illustrated as the same reference voltage VREF used with the comparator 140'. However, embodiments of the invention are not so limited. The comparator 140' and second comparator 225 may use different reference voltages. When in a steady state, the feedback voltage VFB equals the reference voltage VREF, which may be written as equation B4.

$$VFB = VREF \tag{B4}$$

The embodiment of FIG. 5 includes a selectable current sink 215. As a result, the current mirror is converted from using a mirror reference voltage 217 suitable for controlling current in n-channel transistors. Thus, second reference current source PREF2 mirrors the reference current $I_3$ onto adjustment current $I_4$ and reference current sink NREF converts the adjustment current $I_4$ into mirror reference voltage 217.

The reference current $I_3$ can be represented in terms of the reference voltage VREF and the reference resistor $R_A$, which may be written as equation B5.

$$I_3 = VREF/(N \times R_A) \tag{B5}$$

In equation B5, the reference current $I_3$ is written with a scaling factor N relative to the reference resistor $R_A$. If the same reference voltage VREF is used for both the comparator 140' and second comparator 125, then the scaling factor N is simply a relative size between the sink resistor $R_C$ and the reference resistor $R_A$. In other words, with N equal to 2, the sink resistor $R_C$ is twice the size of the reference resistor $R_A$. If a different reference voltage VREF is used for the comparator 140' relative to the second comparator 225, then the scaling factor N may include a relationship between the two reference voltages. In other words, if VREF for the second comparator 225 is twice the VREF for the comparator 140' and the sink resistor $R_C$ is the same size as the reference resistor $R_A$, N would equal 2. Of course, those of ordinary skill in the art will recognize that many relationships between the reference voltages VREF, sink resistor $R_C$, and reference resistor $R_A$ are possible within the scope of the present invention.

In FIG. 5, each of the n-channel transistors (N0, N1, N2, NK) may be a different size. As a non-limiting example, the sizes of the p-channel transistors (N0, N1, N2, NK) are in powers of 2. In other words, n-channel transistor N0 has a relative size of 1, n-channel transistor N1 has a relative size of 2, n-channel transistor N2 has a relative size of 4, and n-channel transistor NK has a relative size of $2^K$. As a result, the combination of the n-channel transistors (N0, N1, N2, NK) in parallel can be configured by the switches (S0, S1, S2, SK) to create a selectable current level $I_2$ proportional to a binary representation on the digital input 105'. As a non-limiting example, if K equals 4, a digital input of 11001 would enable current flow through p-channel transistors P4, P3, and P0 while disabling current flow through P2 and P1.

The switched CMOS devices 215 are connected in a current mirror configuration with the second reference current source PREF2 in combination with reference current sink NREF. In addition, the second reference current source PREF2 is connected in a current mirror configuration with the reference current source PREF such that reference current $I_3$ mirrors selectable current level $I_2$.

In FIG. 5, the size of the reference current source PREF is selected as:

$$J = 2^{(k+1)} - 1 \tag{B6}$$

Therefore, to carry on the previous example of K=4, J would be 31. With the binary weighting, the current through n-channel transistor N0 would be:

$$I_{SO}=I_3/J \quad (B7)$$

Similarly, $I_{S1}$ would equal $2*I_{S0}$, $I_{S1}$ would equal $2*I_{S0}$, $I_{S2}$ would equal $4*I_{S0}$, and $I_{SK}$ would equal $2^K*I_{S0}$. As a result, if all five transistors in the K=4 example were enabled, the summation of current through the transistors, and onto the selectable current level $I_2$, would be: $I_2=I_{SO}+I_{S1}+I_{S2}+I_{S3}=I_{S3}=I_3/J+2I_3/J+4I_3/J+8I_3/J+16I_3/J=15I_3/J$. Since J=31, $I_2$ equals $I_3$.

In other words, for any binary value A on the digital input 105, $I_2$ can be represented as:

$$I_2=A\times I_{SO} \quad (B8)$$

Recall that $I_3$ is defined as $VREF/(N\times R_A)$ and the current mirror enforces that $I_3$ equals $I_2$. Therefore, using equations B7 and B5, $I_{SO}$ can be represented as:

$$I_{SO} = \frac{VREF}{J \times N \times R_A} \quad (B9)$$

And the summed selectable current level $I_2$ can be represented by combining equations B8 and B9.

$$I_2 = VREF\left(\frac{A}{J \times N \times R_A}\right) \quad (B10)$$

Combining equation B3 with equation B10 yields an equation for the pumped voltage VHH.

$$VHH = VREF\left[1 + \frac{R_B}{R_A} + \left(\frac{R_B}{R_A} \times \frac{A}{N \times J}\right)\right] \quad (B11)$$

Or, equation B11 can be rearranged to represent the pumped voltage VHH as:

$$VHH = VREF\left[1 + \frac{R_B}{R_A}\right] + VREF\left[\frac{R_B}{R_A}\left(\frac{A}{N \times J}\right)\right] \quad (B12)$$

For simplicity in explanation, if N is assumed to be 1, equation B12 can be interpreted such that VHH may span a range between a base voltage VBASE on the low end and BASE+a boost voltage VBOOST on the high end. In equation B12, VBASE equals $VREF*(1+(R_B/R_A))$. VBOOST would equal $VREF*(R_B/R_A)$ when A is programmed to its maximum value of J. Conversely, VBOOST would equal 0 when A is programmed to its minimum value of 0. More generally, VHH may be programmed in substantially equal steps between VBASE and VBASE+VBOOST based on the binary value A presented on the digital input 105'. If N equals 1, each increment would be equal to:

$$INC = VREF\left[\frac{R_B}{R_A}\left(\frac{1}{J}\right)\right] \quad (B13)$$

Those of ordinary skill in the art will recognize that VBASE and the incremental adjustment amount INC can be varied by adjusting the relative values of $R_B$ and $R_A$. In addition, the scale factor N may be used to modify the size of the incremental factor because including N in the increment equation yields:

$$INC = VREF\left[\frac{R_B}{R_A}\left(\frac{1}{N \times J}\right)\right] \quad (B14)$$

As previously described, the digital input may use weightings other than a conventional binary weighting. In addition, the switches (S0, S1, S2, SK) described herein may be formed in a number of ways on a semiconductor device. By way of example, and not limitation, the switches (S0, S1, S2, SK) may be formed as NMOS pass gates, PMOS pass gates, or CMOS pass gates.

Figure 6:
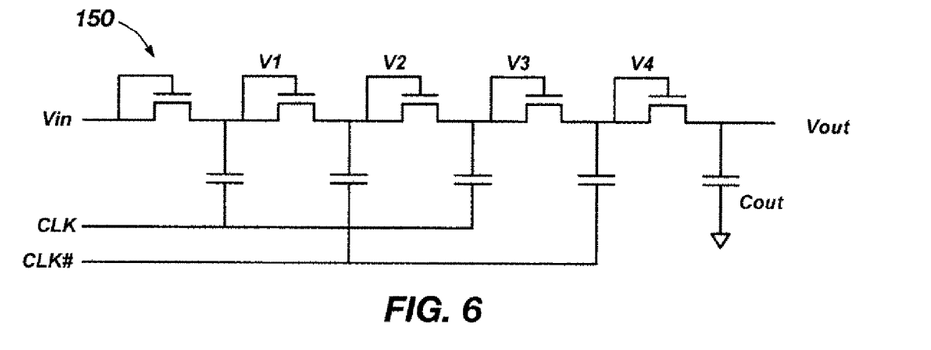
FIG. 6 is a simplified circuit diagram of a charge pump, which may be employed as part of one or more embodiments of the present invention.

FIG. 6 is a simplified circuit diagram of one charge pump 150 of a configuration suitable for use in implementing embodiments of the present invention. The charge pump 150 includes five diode connected n-channel transistors connected in series. An input signal Vin is connected to the first n-channel transistor in the chain of n-channel transistors. Connected between each pair of n-channel transistors is a capacitor. The other side of the capacitors is alternately connected to CLK or CLK#. A final capacitor Cout is connected between the output signal Vout and ground (or other suitable reference potential).

In operation, the charge pump 150 operates to multiply the input voltage Vin to an output voltage Vout by pumping charge along the diode connected n-channel transistor chain as the capacitors are successively charged and discharged during each phase of the CLK cycle. For example, when CLK goes low, V1 may be charged to a diode drop below Vin. When CLK goes high, V2 may be charged to a diode drop below V1. The chain continues through V3 and V4 and on to Vout. The number of capacitors in the chain may be increased or decreased depending on the amount of voltage multiplication needed between Vin and Vout.

The capacitor Cout serves as a filter to even out ripple that may occur on the Vout signal due to the clocking and charging of the capacitors in the chain. In addition, using a relatively high frequency for the CLK (e.g., in the MHz range) can serve to reduce ripple and reduce the need for a large capacitor Cout.

Of course, the charge pump 150 illustrated in FIG. 6 is only one example of a possible charge pump that may be used. Many other charge pumps may be suitable for use in embodiments described herein.

Figure 7:
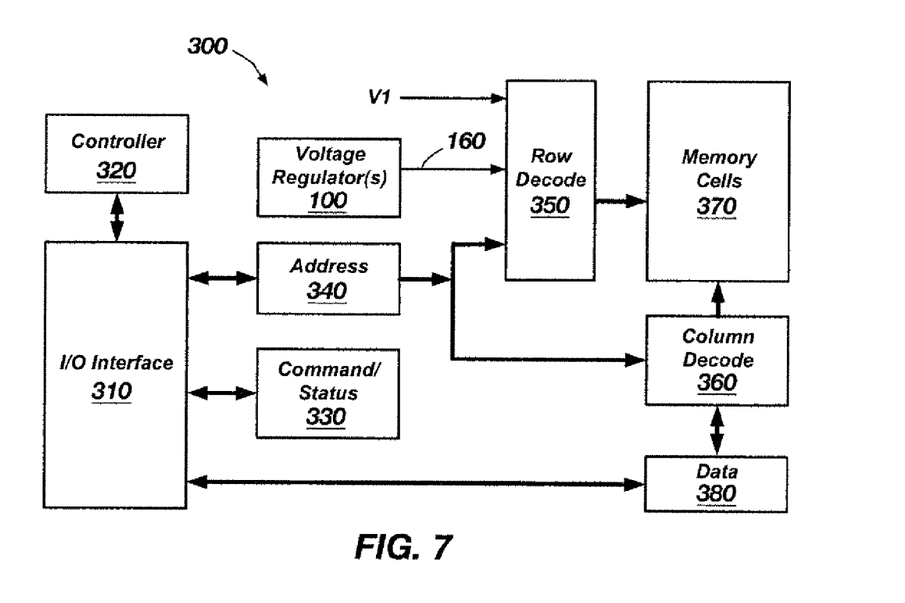
FIG. 7 is a simplified block diagram of a semiconductor memory using one or more embodiments of the present invention.

FIG. 7 is a simplified block diagram of one embodiment of semiconductor memory 300 including a voltage regulator (100, 100') according to one or more embodiments described herein. The semiconductor memory 300 of FIG. 7 is configured as a Flash memory 300 includes an array 370 of flash memory cells, a row decoder 350, for selecting appropriate word lines based on an address input, and a column decoder 360. The selected columns may be directed to a data block 380. The data block 380 may include sense amplifiers for reading information from the memory cells 370. In addition, the data block 380 may be used for placing appropriate voltages on the source of flash cells, the drain of flash cells, or both during programming and erasing. An interface block 310 includes circuitry to interface data input and data output between external circuitry and the data block 380. A controller 320 and command/status buffers 330 control various operations within the Flash memory 300 and commands received from external circuitry. Address buffer 340 buffers addresses between external circuitry and the row decoder 350 and the column decoder 360. Depending on the architectural organization of the memory array 370, the address buffer 340 directs a portion of the addresses to the row decoder 350 and a portion of the addresses to the column decoder 360.

The row decoder 350 may include various voltage inputs such as V1 and the voltage output signals 160 from one or more voltage generators 100. A switch within the row decoder 350 selects a desired voltage for the word lines depending on the present operating mode, such as, for example, read, verify, and program operations.

Of course, there are many other uses within a Flash memory for voltages generated by voltage regulator 100 according to one or more embodiments described herein. As non-limiting examples, some of those uses may be for sense-amplifiers, input buffers, phase locked loops and other analog, digital, and hybrid analog/digital circuits. Furthermore, those of ordinary skill in the art will recognize that voltage regulators 100 according to one or more embodiments described herein may be used in many other types of memory devices as well as other semiconductor devices.

Figure 8:
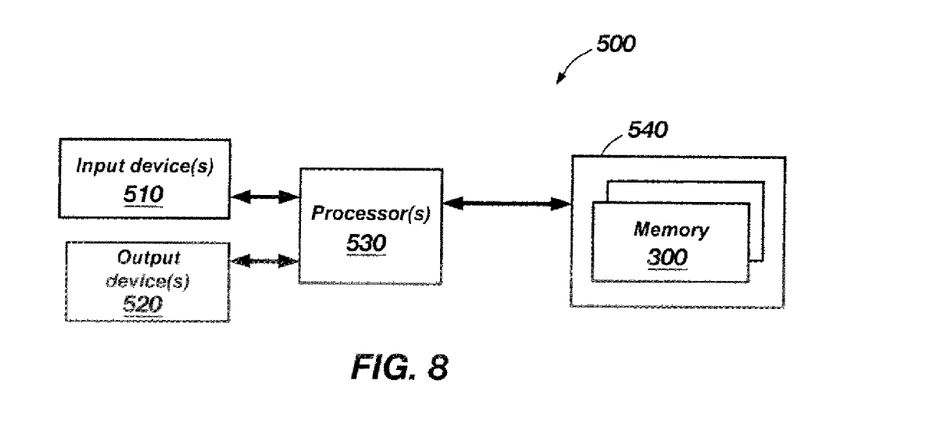
FIG. 8 is a simplified block diagram of a system using one or more embodiments of the present invention.

FIG. 8 is a simplified block diagram of a system implemented according to one or more embodiments described herein. As shown in FIG. 8, an electronic system 50 includes at least one input device 510, at least one output device 520, one or more processors 530, and one or more memory devices 540. The memory devices 540 include at least one semiconductor memory 300 incorporating at least one embodiment of the voltage generators or methods described herein in a memory device. The electronic system 500 may be part of a number of computing, processing, and consumer products. As non-limiting examples, some of these products may include personal computers, handheld devices, cameras, phones, wireless devices, displays, chip sets, set top boxes, games, and vehicles.

CONCLUSION

Embodiments of the present invention can include apparatuses, semiconductor devices, systems, and methods for regulating, generating, and modifying various voltage levels on a semiconductor device using a current mirroring digital-to-analog voltage regulator.

The voltage regulator includes a comparator for generating a comparison output responsive to a comparison between a reference input and a monitor signal, a charge pump, a voltage divider, and a digital-to-analog current generator. The charge pump generates an output voltage responsive to the comparison output. The voltage divider is connected between the output voltage and a ground (or other suitable reference potential) with a divided output connected to the monitor signal. The digital-to-analog current generator generates a control current on the monitor signal by mirroring a reference current onto the control current wherein the control current is responsive to a digital input and proportional to the reference current.

The voltage divider is configured as a feedback resistor connected between the output voltage and the monitor signal and a reference resistor connected between the monitor signal and a ground. The digital-to-analog current generator includes a mirrored current generator for generating a mirrored current from a mirror reference voltage and a digital-to-analog current mirror for mirroring the mirrored current onto the control current. The digital-to-analog current mirror includes switched CMOS devices connected in parallel between the monitor signal and a power signal with gates connected to the mirror reference voltage. The digital input is connected to the switches of the switched CMOS devices so that the control current is generated proportional to the digital input. In some embodiments, the power signal may be a power, such as VDD, and the switched CMOS devices may be implemented as p-channel devices. In other embodiments, the power signal may be a ground and the switched CMOS devices may be implemented as n-channel devices.

Although the present invention has been described with reference to particular embodiments, the present invention is not limited to these described embodiments. Rather, the present invention is limited only by the appended claims and their legal equivalents.

What is claimed is:

1. A voltage regulator, comprising:
    a comparator for generating a comparison output responsive to a comparison between a reference input and a monitor signal;
    a charge pump for generating an output voltage responsive to the comparison output;
    a voltage divider operably coupled between the output voltage and a reference potential with a divided output operably coupled to the monitor signal; and
    a digital-to-analog current generator for generating a control current operably coupled to the monitor signal by mirroring a reference current onto the control current, wherein the control current is responsive to a digital input and proportional to the reference current.

2. The voltage regulator of claim 1, wherein the digital-to-analog current generator is configured as a selectable current source to source the control current onto the monitor signal.

3. The voltage regulator of claim 1, wherein the digital-to-analog current generator is configured as a selectable current sink to sink the control current from the monitor signal.

4. The voltage regulator of claim 1, wherein the output voltage comprises a voltage level between a base voltage and a boost voltage above the base voltage.

5. The voltage regulator of claim 4, wherein the base voltage is proportional to the reference input multiplied by a divider ratio R of a first resistor of the voltage divider to a second resistor of the voltage divider.

6. The voltage regulator of claim 4, wherein the base voltage is proportional to the reference input plus the reference input multiplied by a divider ratio R of a first resistor of the voltage divider to a second resistor of the voltage divider.

7. The voltage regulator of claim 4, wherein the digital input is an integer A between 0 and a non-zero integer J, and the boost voltage is selectable in substantially equal increments of A*R/J.

8. A voltage regulator, comprising:
    a comparator for generating a comparison output responsive to a comparison between a reference input and a monitor signal;
    a charge pump for generating a pumped voltage responsive to the comparison output;
    a feedback resistance operably coupled between the pumped voltage and the monitor signal;
    a reference resistance operably coupled between the monitor signal and a reference potential; and
    a mirrored current generator, comprising:
        a reference voltage generator comprising:
            a second comparator for generating a mirror reference voltage; and
            a reference current source for generating a reference current proportional to the mirror reference voltage; and
        a digital-to-analog current mirror comprising a plurality of switched CMOS devices operably coupled in parallel between the monitor signal and a power signal with gates operably coupled to the mirror reference voltage, the plurality of switched CMOS devices configured to generate a control current proportional to a digital input operably coupled thereto.

9. The voltage regulator of claim 8, wherein each of the plurality of switched CMOS devices comprise a NMOS device operably coupled in series with a switch element and between the monitor signal and the reference potential, wherein:
 a gate of each NMOS device is operably coupled to the mirror reference voltage;
 the switch element is controlled by a signal of the digital input; and
 the control current is proportional to a sum of the current flowing through each switched on NMOS device.

10. The voltage regulator of claim 8, wherein each of the plurality of switched CMOS devices comprise a PMOS device operably coupled in series with a switch element and between the monitor signal and a power source, wherein:
 a gate of each PMOS device is operably coupled to the mirror reference voltage;
 the switch element is controlled by a signal of the digital input; and
 the control current is proportional to a sum of the current flowing through each switched on PMOS device.

11. The voltage regulator of claim 8, wherein the pumped voltage comprises a voltage level between a base voltage and a boost voltage above the base voltage.

12. The voltage regulator of claim 11, wherein the base voltage is proportional to a ratio between the feedback resistance and the reference resistance.

13. The voltage regulator of claim 11, wherein the boost voltage is proportional to a ratio between the feedback resistance and the reference resistance.

14. A method, comprising:
 mirroring a reference current onto a selectable current level;
 controlling the selectable current level with a digital input to a plurality of switched CMOS devices operably coupled in parallel;
 combining the selectable current level with an output of a voltage divider to generate a monitor signal;
 comparing the monitor signal to a reference voltage;
 generating a pumped voltage responsive to the comparison result; and
 feeding the pumped voltage back to an input of the voltage divider.

15. The method of claim 14, wherein the pumped voltage is between a base voltage and a boost voltage above the base voltage responsive to the digital input.

16. The method of claim 15, wherein the boost voltage is selectable in substantially equal increments between zero and $2^N-1$, wherein N is the number of bits in the digital input.

17. The method of claim 14, wherein the selectable current level comprises a current sink for sinking at least some current from the monitor signal to a reference potential.

18. The method of claim 14, wherein the selectable current level comprises a current source for sourcing at least some current to the monitor signal from a power source.

19. A semiconductor memory, comprising:
 at least one memory cell; and
 at least one voltage regulator, comprising:
  a comparator for comparing a reference input and a monitor signal and outputting a comparison result;
  a charge pump for generating a pumped voltage responsive to the comparison result;
  a voltage divider operably coupled between the pumped voltage and a reference potential with a divided output operably coupled to the monitor signal; and
  a digital-to-analog current generator for mirroring a reference current to a control current operably coupled to the monitor signal, wherein a current amount for the control current is correlated to a digital input.

20. The semiconductor memory of claim 19, wherein the digital-to-analog current generator comprises:
 a mirrored current generator for generating a mirror reference voltage responsive to the comparison of a second reference voltage and a feedback voltage; and
 a selectable current source operably coupled to the mirror reference voltage and the digital input for generating the control current.

21. The semiconductor memory of claim 19, wherein the digital-to-analog current generator comprises:
 a mirrored current generator for generating a mirror reference voltage responsive to the comparison of a second reference voltage and a feedback voltage; and
 a selectable current sink operably coupled to the mirror reference voltage and the digital input for generating the control current.

22. A system, comprising:
 at least one processor; and
 at least one semiconductor memory comprising:
  at least one memory cell; and
  at least one voltage regulator, comprising:
   a comparator for generating a comparison result responsive to a comparison of a reference input and a monitor signal;
   a charge pump for generating an output signal responsive to the comparison result;
   a voltage divider operably coupled between the output signal and a reference potential with a divided output operably coupled to the monitor signal;
   a second comparator for generating a mirror reference voltage;
   a reference current source operably coupled to the mirror reference voltage for generating a reference current proportional to the mirror reference voltage; and
   a digital-to-analog current generator for mirroring the reference current to a current on the monitor signal, wherein the current on the monitor signal is proportional to a digital input.

23. The system of claim 22, wherein:
 the voltage divider comprises a feedback resistance operably coupled between the output signal and the monitor signal and a reference resistance operably coupled between the monitor signal and the reference potential; and
 the output signal comprises a base voltage plus a boost voltage and the boost voltage is proportional to a ratio between the feedback resistance and the reference resistance.

24. The system of claim 23, further comprising a reference current sink operably coupled to the reference current source and including a resistance value N times a resistance value of the reference resistance and the boost voltage is proportional to a ratio between the feedback resistance, the reference resistance, and the reference current sink.

25. The voltage regulator of claim 23, wherein the base voltage is proportional to a ratio between the feedback resistance and the reference resistance.

* * * * *